United States Patent [19]

Albano et al.

[11] Patent Number: 5,639,838
[45] Date of Patent: Jun. 17, 1997

[54] FLUOROELASTOMERS ENDOWED WITH HIGH RESISTANCE TO POLAR SOLVENTS AND TO BASES

[75] Inventors: Margherita Albano, Milan; Vincenzo Arcella, Novara; Graziella Chiodini, Saronno; Anna Minutillo, Tavernola Bergamasca, all of Italy

[73] Assignee: Ausimont S.p.A., Italy

[21] Appl. No.: 538,180

[22] Filed: Aug. 23, 1995

Related U.S. Application Data

[63] Continuation of Ser. No. 218,112, Mar. 25, 1994, abandoned.

[30] Foreign Application Priority Data

Mar. 30, 1993 [IT] Italy ................... MI93A0606

[51] Int. Cl.$^6$ ........................... C08F 16/24
[52] U.S. Cl. .................. 526/247; 526/249; 526/254; 526/255
[58] Field of Search .................. 526/247, 249, 526/254, 255

[56] References Cited

U.S. PATENT DOCUMENTS

| | | |
|---|---|---|
| 3,235,537 | 2/1966 | Albin et al. . |
| 3,291,843 | 12/1966 | Fritz et al. . |
| 4,035,565 | 7/1977 | Apotheker et al. . |
| 4,243,770 | 1/1981 | Tatemoto et al. . |
| 4,564,662 | 1/1986 | Albin . |
| 4,694,045 | 9/1987 | Moore . |
| 4,745,165 | 5/1988 | Arcella et al. . |
| 4,789,717 | 12/1988 | Giannetti et al. . |
| 4,864,006 | 9/1989 | Giannetti et al. . |
| 4,943,622 | 7/1990 | Naraki et al. . |
| 4,948,853 | 8/1990 | Logothetis . |
| 5,260,392 | 11/1993 | Arcella et al. ............ 526/247 |
| 5,260,393 | 11/1993 | Arcella et al. ............ 526/247 |

FOREIGN PATENT DOCUMENTS

| | | | |
|---|---|---|---|
| 0075312 | 3/1983 | European Pat. Off. ........ 526/247 |
| 0131308A1 | 1/1985 | European Pat. Off. . |
| 0136596A2 | 4/1985 | European Pat. Off. . |
| 0219065 | 4/1987 | European Pat. Off. ........ 526/247 |
| 0219065A2 | 4/1987 | European Pat. Off. . |
| 0359147 | 3/1990 | European Pat. Off. ........ 526/247 |
| 0398241A2 | 11/1990 | European Pat. Off. . |
| 0407937A1 | 1/1991 | European Pat. Off. . |
| 0518073A1 | 12/1992 | European Pat. Off. . |
| 63-289008 | 11/1988 | Japan ......................... 526/247 |
| 1289813 | 11/1989 | Japan ......................... 526/247 |

OTHER PUBLICATIONS

Chemical Abstracts, Abstract No. CA115(8):73436Z abstract of JP-A-3066714 (Mar. 22, 1991).

*Primary Examiner*—Joseph L. Schofer
*Assistant Examiner*—N. Sarofim
*Attorney, Agent, or Firm*—Bryan Cave LLP

[57] ABSTRACT

Fluoroelastomers comprising, by mole:

(a) from 33 to 75% of tetrafluoroethylene (TFE);
(b) from 15 to 45% of a perfluorovinylether (PVE);
(c) from 10 to 22% of vinylidene fluoride (VDF).

They are endowed with high resistance to polar solvents and to bases, excellent compression set also at high temperatures, low Tg and good processability.

They result particularly suitable for the manufacture of sealing elements (O-rings) for plants intended to the production of methylterbutylether (MTBE).

6 Claims, No Drawings

FLUOROELASTOMERS ENDOWED WITH HIGH RESISTANCE TO POLAR SOLVENTS AND TO BASES

This is a continuation of U.S. application Ser. No. 08/218,112, filed Mar. 25, 1994, now abandoned.

The present invention relates to new fluoroelastomers endowed with high resistance to polar solvents and to bases, excellent compression set at high temperature, low glass transition temperature ($T_g$) and good processability.

It is known in the art the use of fluoroelastomers in a plurality of applications where a high thermal and chemical resistance is requested. An example of such applications is the manufacture of sealing elements, in particular O-rings, for plants intended to the production of methylterbutylether (MTBE), for which a low compression set value is required, especially at high temperatures, and a swelling rate in MTBE at 55° C. for 70 hours (expressed as percent of volume variation) lower than 20%.

For such purposes thoroughly fluorinated polymers are usually employed, consisting of tetrafluoroethylene (TFE) and of a perfluoroalkylvinylether (PAVE), such as, for instance, those described in U.S. Pat. No. 4,948,853. Such products, though having good resistance to solvents, show poor properties of thermal resistance. Moreover, they are characterized by high $T_g$ values and therefore are processable with difficulty.

The same inconveniences are present also in the fluoroelastomers described in patent application EP-131,308. They are terpolymers constituted by TFE, a perfluoroalkylvinylether and vinylidene fluoride (VDF), the last one in amounts not higher than 2% by mole. The VDF units act as site for ionic vulcanization, which is carried out by curing systems comprising a polyhydroxyl compound (for instance Bisphenol AF) as cross-linking agent and a cyclic polyether as accelerator. According to such patent application, the VDF amount must not exceed 2% by mole for not impairing oxidation and solvent resistance.

Finally, in patent application EP-219,065, perfluoroelastomers are described, based on TFE copolymerized with 0.1–5% by mole of HFP and 12–50% by mole of a long chain perfluorovinylether having the formula:

$$CF_2=CFO-(CF_2CFXO)_m-R_f$$

where: $R_f$=perfluoroalkyl $C_1-C_6$; X=—F, —CF$_3$; m=1–5. The presence of a small amount of HFP permits to improve compression set and mechanical properties. However, they are very expensive products, because an industrial scale synthesis of long chain perfluorovinylethers is particularly complex.

The Applicant has now unexpectedly found new fluoroelastomers consisting of TFE and of a perfluorovinylether and containing VDF in amounts comprised between 10 and 22% by mole, endowed with high resistance to polar solvents and to bases, excellent compression set also at high temperatures, low $T_g$ and good processability. In particular, such fluoroelastomers are characterized by a swelling rate in MTBE at 55° C. for 70 hours lower than 20%, and therefore they are particularly suited for the manufacture of sealing elements for plants intended to MTBE production.

Object of the present invention are therefore fluoroelastomers consisting essentially of:

(a) 33–75% by mole of tetrafluoroethylene (TFE);
(b) 15–45% by mole of a perfluorovinylether (PVE);
(c) 10–22% by mole of vinylidene fluoride (VDF).

The perfluorovinylethers (PVE) have the formula:

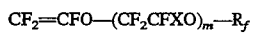

$$CF_2=CFO-R_f$$

where $R_f$ is a perfluoroalkyl $C_1-C_6$, preferably $C_1-C_4$, or a perfluoroalkyl $C_2-C_9$, containing one or more ether group.

Among them, particularly employable are: perfluoromethylvinylether, perfluoroethylvinylether, perfluoropropylvinylether, perfluoro(2-n-propoxy-propylvinylether), perfluoro(3-methoxy-propylvinylether), perfluoro(2-methoxyethylvinylether), perfluoro(3,6,9-trioxa-5,8-dimethyl-dodec-1-ene), perfluoro(5-methyl-3,6-dioxa-non-1-ene), etc., and in general the perfluoroalkoxy-alkylvinylethers described in U.S. Pat. No. 3,291,843. Perfluoromethylvinylether and perfluoropropylvinylether are particularly preferred.

Mixtures of different PVE can be present in the fluoroelastomers object of the present invention.

Particularly preferred are fluoroelastomers consisting essentially of:

(a) 40–60% by mole of TFE;
(b) 20–40% by mole of PVE;
(c) 12–20% by mole of VDF.

It is important to point out that, notwithstanding the presence of hydrogenated groups deriving from VDF, the fluoroelastomers object of the present invention show such a high chemical resistance that the swelling rate in MTBE is lower than 20% by volume and the resistance to bases (in particular NaOH) is high. Such properties of chemical resistance are associated with low $T_g$ values (generally lower than −10° C.) and with a good processability, in particular as regards mold release.

The preparation of the fluoroelastomers object of the present invention can be performed by copolymerization of the monomers in aqueous emulsion according to methods well known in the art, in the presence of radical initiators (for instance, alkali metal or ammonium persulphates, perphosphates, perborates or percarbonates), optionally in combination with ferrous, cuprous, silver or other easily oxidable metal salts. In the reaction medium, surfactants are also present, such as, for instance, (per) fluoroalkyl or (per) fluoropolyoxyalkylene carboxylates or sulphonates (for instance ammonium perfluorooctanoate), or others known in the art.

After completing the polymerization, the fluoroelastomer is isolated from the emulsion with conventional methods, such as coagulation by adding electrolytes or by cooling.

Alternatively, the polymerization reaction can be carried out in bulk or in suspension, in an organic liquid containing a suitable radical initiator, according to well known techniques.

The polymerization reaction is generally carried out at temperatures comprised between 25° and 150° C., under a pressure up to 10 MPa.

The preparation of the fluoroelastomers object of the present invention is preferably carried out in aqueous emulsion in the presence of an emulsion, dispersion or microemulsion of perfluoropolyoxyalkylenes, according to what described in U.S. Pat. Nos. 4,789,717 and 4,864,006, which are herein incorporated by reference, or also in the presence of a microemulsion of fluoropolyoxyalkylenes having end-groups and/or repeating units containing hydrogen, as described in Italian patent application No. MI 93A/001007 in the name of the Applicant, which is herein incorporated by reference.

The fluoroelastomers object of the present invention are preferably vulcanized via peroxides, therefore they preferably contain along the chain and/or in terminal position of the macromolecules iodine and/or bromine atoms. The introduction of such iodine and/or bromine atoms can be carried out by addition, in the reaction mixture, of brominated and/or iodinated cure-site comonomers, such as bromine and/or iodine olefins having from 2 to 10 carbon atoms (as described for instance in U.S. Pat. Nos. 4,035,565 and 4,694,045), or iodo- and/or bromo-fluoroalkylvinylethers (as described in U.S. Pat. Nos. 4,745,165 and 4,564,662), in such amounts that the content of cure-site comonomers in the final product is generally comprised between 0.05 and 2 moles per 100 moles of the other basic monomer units.

Alternatively or also in association with the cure-site comonomers, it is possible to introduce terminal iodine and/or bromine atoms by addition to the reaction mixture of iodinated and/or brominated chain transfer agents, such as for example compounds having the formula $R_f(I)_x(Br)_y$, where $R_f$ is a (per)fluoroalkyl or a (per)fluorochloroalkyl having from 1 to 8 carbon atoms, while x and y are integers comprised between 0 and 2, with $1 \leq x+y \leq 2$ (see for instance U.S. Pat. Nos. 4,243,770 and 4,943,622).

It is also possible to employ as chain transfer agents alkali or alkaline-earth metal iodides and/or bromides, according to what described in patent application EP-407,937.

In alternative or in association with the chain transfer agents containing iodine and/or bromine, other chain transfer agents known in the art can be used, such as ethyl acetate, diethylmalonate, etc.

The peroxide vulcanization is performed, according to known techniques, by adding a suitable peroxide able to generate radicals by heating. Among the most commonly employed, we can cite: dialkylperoxides, such as for instance di-terbutyl-peroxide and 2,5-dimethyl-2,5-di(terbutylperoxy)hexane; dicumyl peroxide; dibenzoyl peroxide; diterbutyl perbenzoate; di-[1,3-dimethyl-3-(terbutyl-peroxy)butyl] carbonate. Other peroxide systems are described, for instance, in patent application EP-136,596.

To the vulcanization blend other products are generally added, such as:

(a) cross-linking coagents, in amounts generally comprised between 0.5 and 10%, preferably between 1 and 7%, by weight with respect to the polymer; among them commonly used are: triallyl-cyanurate; triallyl-isocyanurate (TAIC); tris(diallylamine)-s-triazine; triallyl-phosphite; N,N-diallyl-acrylamide; N,N,N',N'-tetraallyl-malonamide; trivinyl-isocyanurate; 2,4,6-trivinyl-methyltrisiloxane, etc.; TAIC is particularly preferred;

(b) a metal compound, in amounts comprised between 1 and 15%, preferably between 2 and 10%, by weight with respect to the polymer, selected from divalent metal oxides or hydroxides, such as for instance Mg, Zn, Ca or Pb, optionally associated with a salt of a weak acid, such as for example Ba, Na, K, Pb, Ca stearates, benzoates, carbonates, oxalates or phosphites;

(c) other conventional additives, such as thickening agents, pigments, antioxidants, stabilizers and the like.

Differently from the most part of fluoroelastomers, the products object of the present invention generally do not require extended post-curing treatments.

As already pointed out hereinabove, fluoroelastomers object of the present invention can be utilized for the manufacture of sealing elements, such as O-rings and shaft seals, or fuel pipes and fittings.

The following examples are given to better illustrate the present invention and cannot be construed as a limitation of the scope of the invention itself.

EXAMPLE 1

Preparation of the microemulsion of perfluoropolyoxyalkylenes.

In a glass flask equipped with a stirrer, 96.1 g of a compound having the formula:

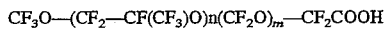

having n/m=10 and an average molecular weight of 570, were mixed with 14.5 g of $NH_4OH$ at 30% by volume. 29 g of demineralized water were then added. To the so obtained mixture 16 g of Galden® D02 of the formula:

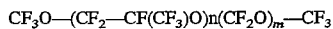

were added, having n/m=20 and an average molecular weight of 450. At a temperature comprised between 18° and 50° C. the mixture was in the form of a microemulsion, appearing as a limpid thermodynamically stable solution.

Polymerization reaction

In a 10 l reactor, equipped with a stirrer working at 545 rpm, 6500 g of water and the microemulsion of perfluoropolyoxyalkylenes prepared as described above were fed after evacuation. The reactor was brought under pressure with a monomeric mixture having the following molar composition: 4% of VDF; 64% of perfluoromethylvinylether (PMVE); 32% of TFE. The temperature was kept for the whole duration of the reaction at 80° C., the pressure at 22 relative bar.

0,182 g of ammonium persulphate (APS), dissolved in water, were then added as polymerization initiator. To the reaction mixture 0.686 g of 1,4-diiodoperfluorobutane dissolved in 1.3 g of Galden® D02 and 3.24 g of bromovinylether (BVE) were then added.

During the reaction, the pressure was kept constant by feeding the monomers with the following molar ratios: VDF 17%, PMVE 38%, TFE 45%. At each 5% increase of the conversion, 0,686 g of 1,4-diiodoperfluorobutane dissolved in 1.3 g of Galden® D02 and 3.24 g of BVE were simultaneously added.

After 268 minutes from the reaction start, 2860 g of polymer were obtained. From the reactor, cooled to room temperature, the emulsion was discharged and the polymer was coagulated by adding an aqueous solution of aluminum sulphate. The polymer, separated and washed with water, was dried in an air circulation oven at 60° C. for 24 hours.

In Table 1 the characteristics of the polymer as such are reported. The product was then vulcanized by peroxides: the composition of the vulcanization mixture and the characteristics of the cured product are reported in Table 2.

The chemical resistance measurements were carried out by dipping a 77×12.5×2 mm specimen, obtained by molding and subsequent die-cutting, in a vessel containing 170 ml of the solvent, at a temperature and for a time as reported in Table 2.

The steam resistance measurements were carried out on a specimen like that used for the chemical resistance tests, inserted in an autoclave containing water, at a temperature and for a time as indicated in Table 2.

EXAMPLE 2

In a 10 l reactor, equipped with a stirrer working at 545 rpm, 6500 g of water and the microemulsion of perfluoropolyoxyalkylenes prepared as described in Example 1 were fed after evacuation. The reactor was brought under pressure with a monomeric mixture having the following molar composition: 3% of VDF; 60% of perfluoromethylvinylether (PMVE); 37% of TFE. The temperature was kept for the whole duration of the reaction at 80° C., the pressure at 25 relative bar.

0.26 g of ammonium persulphate (APS), dissolved in water, were then added as polymerization initiator. To the reaction mixture 14.4 g of 1,6-diiodoperfluorohexane dissolved in 25.2 g of Galden® D02 and 3.186 g of bromovinylether (BVE) were then added.

During the reaction, the pressure was kept constant by feeding the monomers with the following molar ratios: VDF 10%, PMVE 40%, TFE 50%. At each 5% increase of the conversion, 3.186 g of BVE were added.

After 305 minutes from the reaction start, 2950 g of polymer were obtained. From the reactor, cooled to room temperature, the emulsion was discharged and the polymer was coagulated by adding an aqueous solution of aluminum sulphate. The polymer, separated and washed with water, was dried in an air circulation oven at 60° C. for 24 hours.

In Table 1 the characteristics of the polymer as such are reported. The product was then vulcanized by peroxides: the composition of the vulcanization mixture and the characteristics of the cured product are reported in Table 2. The chemical and steam resistance measurements were carried out as described in Example 1.

TABLE 1

| EXAMPLE | 1 | 2 |
|---|---|---|
| Polymer composition (% mole) | | |
| TFE | 47 | 52 |
| PMVE | 33 | 35 |
| VDF | 20 | 13 |
| Mooney Viscosity ML$^{121° C.}$ (1 + 10) (ASTM) D1646) | 50 | 20 |
| T$_g$ (DSC) (°C.) (ASTM D3418-82) | −16.1 | −15.0 |

TABLE 2

| EXAMPLE | 1 | 2 |
|---|---|---|
| Vulcanization mixture composition | | |
| Polymer (g) | 100 | 100 |
| Luperco® 101 XL (phr) | 3 | 1.5 |
| Drimix® TAIC (") | 4 | 2 |
| ZnO (") | 5 | 5 |
| Carbon black MT (") | 30 | 15 |
| Vulcanization mixture characteristics | | |
| ODR 177° C. arc 3, 12' (ASTM D2084-81) | | |
| ML (pounds.inch) | 9 | 3 |
| MH (pounds.inch) | 130 | 111 |
| t$_{s2}$ (sec) | 39 | 60 |
| t'$_{90}$ (sec) | 129 | 159 |
| Vulcanizate characteristics after press-curing at 170° C. for 10' and post-curing in oven (*) | | |
| *MECHANICAL PROPERTIES (ASTM D412-83) | | |
| 100% Modulus (MPa) | 16.8 | 5.5 |
| Tensile strength at break (Mpa) | 20.4 | 16.6 |
| Elongation at break (%) | 118 | 172 |
| Hardness, Shore A (points) | 80 | 65 |
| *TR TEST (ASTM D1329) | | |
| TR 10% | −10 | −9 |
| TR 30% | −6 | −4 |
| TR 50% | −3.3 | −2.3 |
| *COMPRESSION SET 200° C. × 70 h | | |

TABLE 2-continued

| EXAMPLE | 1 | 2 |
|---|---|---|
| (ASTM D395) | | |
| Disc (35 × 12.5 mm) (%) | 13 | 10 |
| Disc (13 × 6 mm) (%) | 19 | 18 |
| Pellets (6 mm) (%) | 20 | 24 |
| *CHEMICAL RESISTANCE | | |
| - MTBE 55° C. × 70 h ΔV (%) | +18.9 | +14 |
| ΔP (%) | +6.8 | +6 |
| - acetone 25° C. × 24 h ΔV (%) | +11.4 | — |
| ΔP (%) | +4.3 | — |
| - NaOH 55° C. × 70 h ΔV (%) | +1 | — |
| (27% p solution) ΔP (%) | +0.3 | — |
| *STEAM RESISTANCE | | |
| 250° C. × 70 h ΔV (%) | +10.5 | +7 |
| ΔP (%) | +2.4 | +2 |

(*)at 230° C. for 24 hours (Ex.1)
at 200° C. for 8 hours (Ex.2)

We claim:

1. Fluoroelastomers, vulcanizable by peroxides, consisting essentially of:

(a) 33–75% by mole of tetrafluoroethylene (TFE);

(b) 15–45% by mole of a perfluorovinylether (PVE); and (c) 10–22% by mole of vinylidene fluoride (VDF), wherein halogen atoms selected from the group consisting of iodine atoms, bromine atoms, and mixtures thereof are present in the chain, the terminal positions, or both the chain and terminal positions, said fluoroelastomers having a resistance to methylterbutylether such that they are capable of being vulcanized to form vulcanizates having a swelling rate in methylterbutylether at 55° C. for 70 hours, expressed as a percent of volume variation, of lower than 20%.

2. Fluoroelastomers according to claim 1, consisting essentially of:

(a) 40–60% by mole of TFE;

(b) 20–40% by mole of PVE;

(c) 12–20% by mole of VDF.

3. Fluoroelastomers according to claim 1, wherein the PVE has the formula:

$$CF_2=CFO-R_f$$

where $R_f$ is a perfluoroalkyl $C_1$–$C_6$, or a perfluoroalkyl $C_2$–$C_9$ containing one or more ether groups.

4. Fluoroelastomers according to claim 3, wherein the PVE is selected from: perfluoromethylvinylether, perfluoroethylvinylether, perfluoropropylvinylether, perfluoro (2-n-propoxy-propylvinylether), perfluoro (3-methoxy-propylvinylether), perfluoro (2-methoxyethylvinylether), perfluoro (3,6,9-trioxa-5,8-dimethyldodec - 1-ene), perfluoro (5-methyl-3,6-dioxa-non-1-ene), or mixtures thereof.

5. Fluoroelastomers according to claim 4, wherein the PVE is selected from perfluoromethylvinylether and perfluoropropylvinylether.

6. Fluoroelastomers according to claim 1, obtainable by a copolymerization process of the monomers in aqueous emulsion in the presence of a microemulsion of perfluoropolyoxyalkylenes or of fluoropolyoxyalkylenes having end-groups and/or repeating units containing hydrogen, and optionally in the presence of iodinated and/or brominated chain transfer agents.

* * * * *